Figure 3:
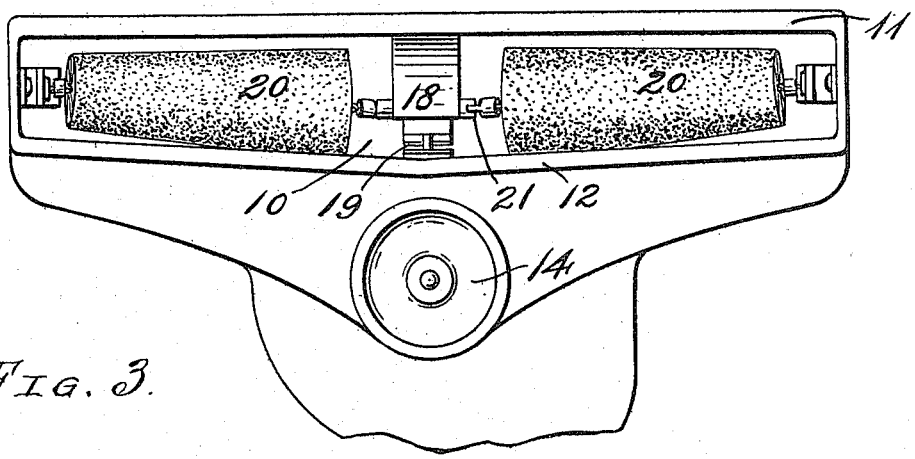

J. B. KIRBY.
VACUUM CLEANING DEVICE.
APPLICATION FILED NOV. 15, 1913.
1,209,721.
Patented Dec. 26, 1916.
3 SHEETS—SHEET 1.
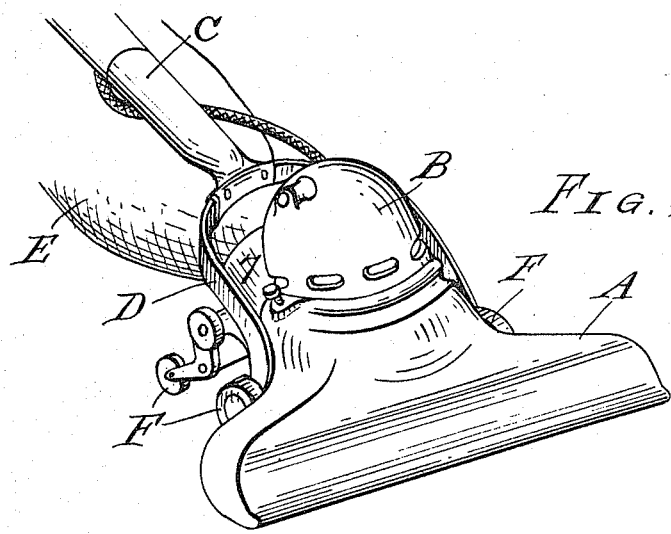
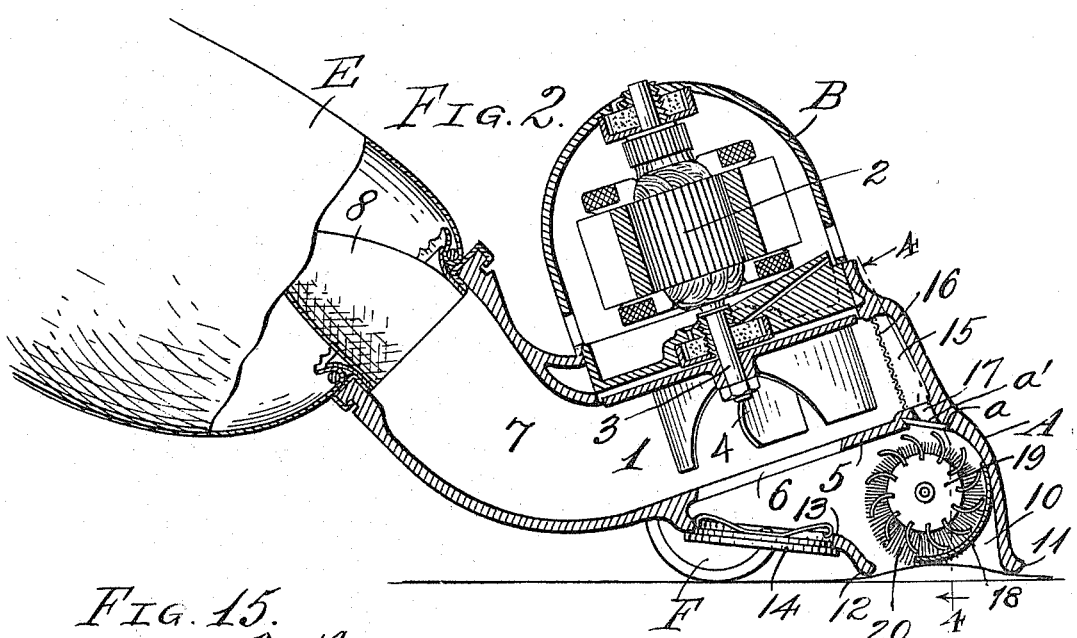
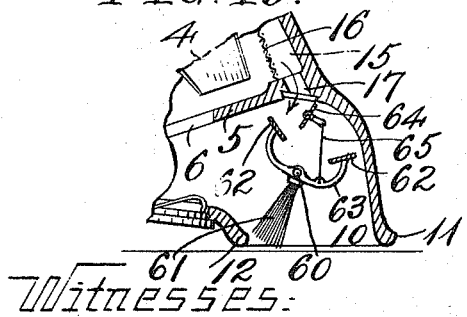
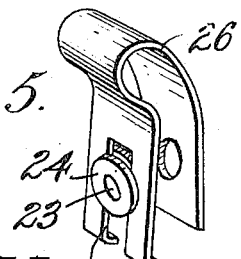
Witnesses:
A. L. Lord.
R. L. Bruck.
Inventor,
James B. Kirby
By Hull and Smith Atty.

J. B. KIRBY.
VACUUM CLEANING DEVICE.
APPLICATION FILED NOV. 15, 1913.

1,209,721.

Patented Dec. 26, 1916.
3 SHEETS—SHEET 2.

Witnesses:
A. L. Lord,
R. L. Bruck.

Inventor.
James B. Kirby
By Stull and Smith Atty.

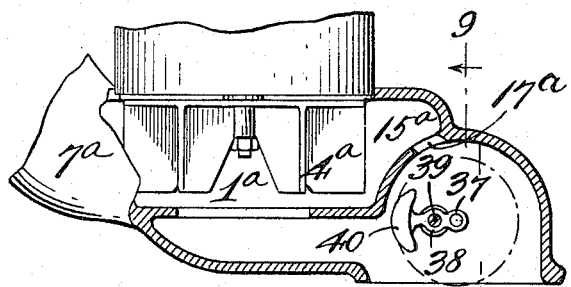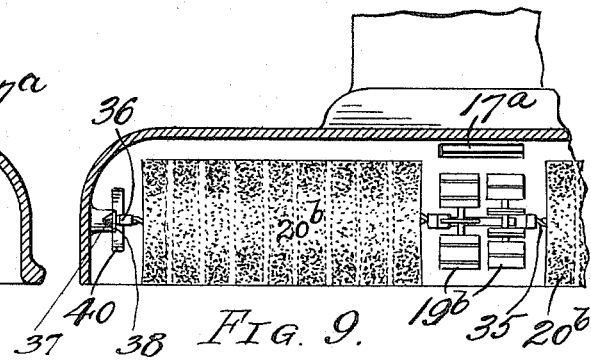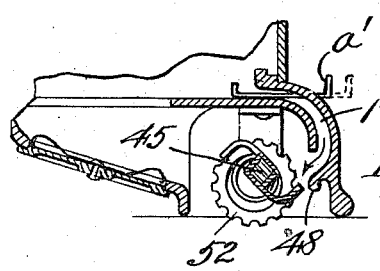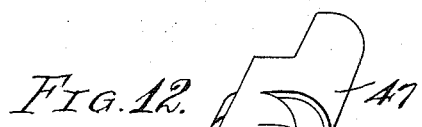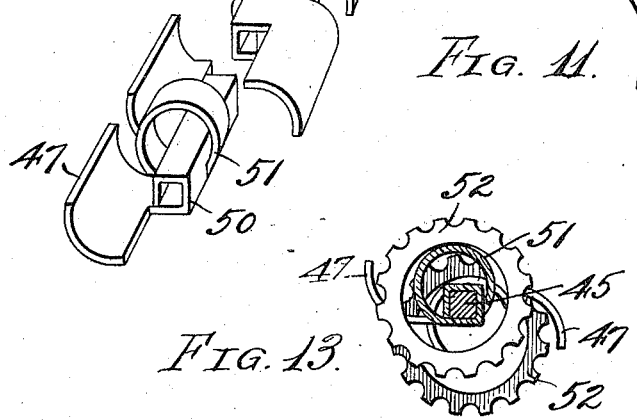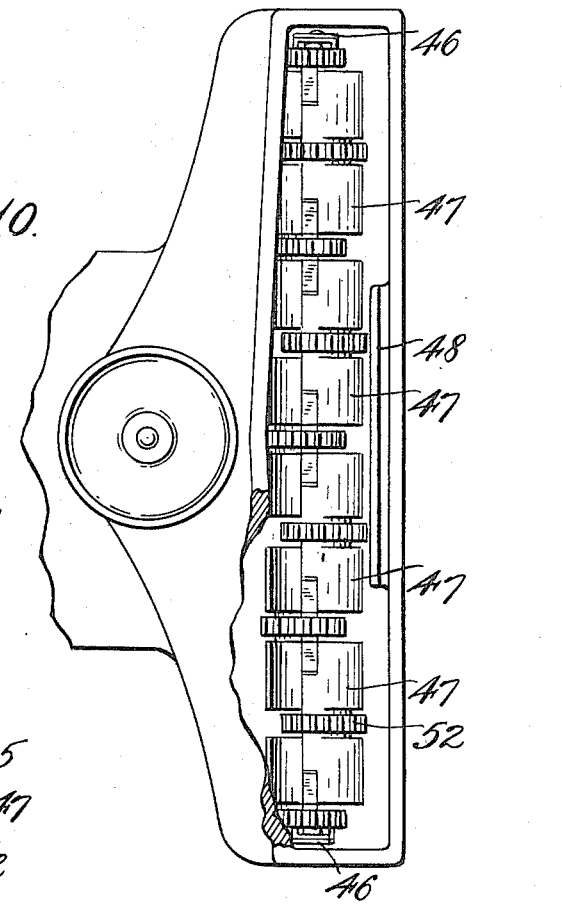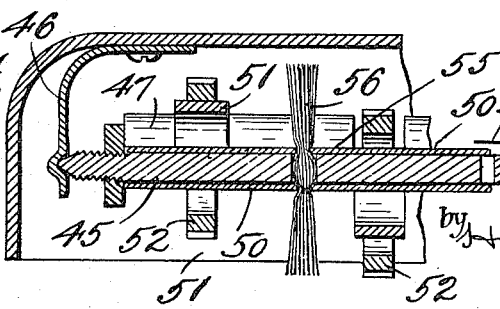

UNITED STATES PATENT OFFICE.

JAMES BLAINE KIRBY, OF CLEVELAND, OHIO.

VACUUM CLEANING DEVICE.

1,209,721. Specification of Letters Patent. Patented Dec. 26, 1916.

Original application filed March 30, 1912, Serial No. 687,510. Renewed January 19, 1914, Serial No. 813,110. This continuation application filed November 15, 1913. Serial No. 801,125.

*To all whom it may concern:*

Be it known that I, JAMES BLAINE KIRBY, a citizen of the United States, residing at Cleveland, in the county of Cuyahoga and State of Ohio, have invented a certain new and useful Improvement in Vacuum Cleaning Devices, of which the following is a full, clear, and exact description, reference being had to the accompanying drawings.

This invention relates to vacuum cleaning machines and has for its object the provision of a device of this character which will clean rugs, carpets, and other floor coverings more rapidly and efficiently than previous devices.

The principle of this invention consists in this, that sweeping, brushing, beating, or other agitating devices, located within the inlet mouth of the apparatus are operated by means of an air-motor or like contrivance, connected to the high-pressure side of the exhaust fan; further and subsidiary features relate to the location of the air duct so as to receive the least possible amount of dust, etc., from the fan and the relative arrangement of parts whereby a compact and efficient machine is produced which will operate close to the walls and corners and which can be introduced beneath the furniture with a minimum of obstruction.

In the performance of my said invention I preferably employ a vacuum cleaner of the type having a fan casing and a hollow body or shoe adjacent to each other, the shoe communicating with the fan casing at its region of low pressure, and the high pressure region of said fan casing being connected to a porous bag or like device whereby the dust and air are separated and a material obstruction offered to the escape of the air. The agitating devices are located in the mouth of this hollow body or shoe so as to come in contact with the carpets, rugs or other fabrics over which the machine is passed and these devices are driven or operated by means of a blast of air passing through a duct connected with the high pressure region of said fan casing and preferably discharging into said hollow body or shoe. The force of this air blast is applied to the agitating devices by means of vanes, feathers, wings, or the like, and the same may be connected directly to the agitating devices or may be geared thereto as may be convenient. The agitating devices themselves may consist of brushes, beaters, loose rings, or other suitable members, and may be mounted either upon a rotatable shaft or an oscillating device as may be desirable.

This application is a continuation of my former application filed January 19, 1914, Serial No. 813,110, which in turn was a renewal of a yet earlier application filed March 30, 1912, Serial No. 687,510.

In the drawings accompanying and forming a part of this application, I have illustrated several forms of construction in which my invention may be embodied.

Figure 4:
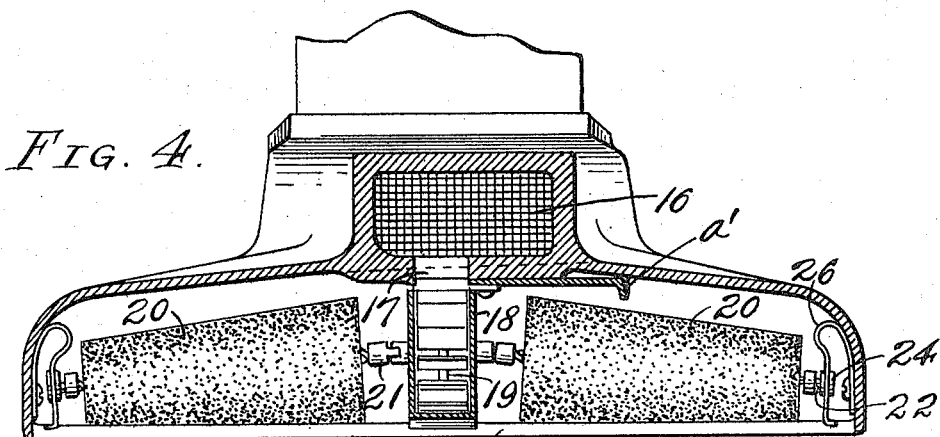
Figure 7:
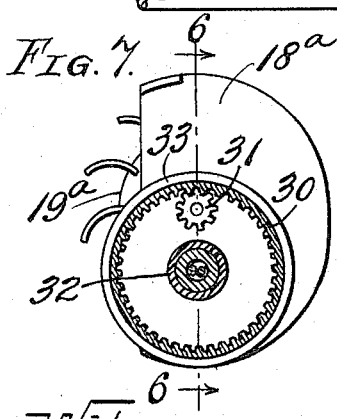
Figure 6:
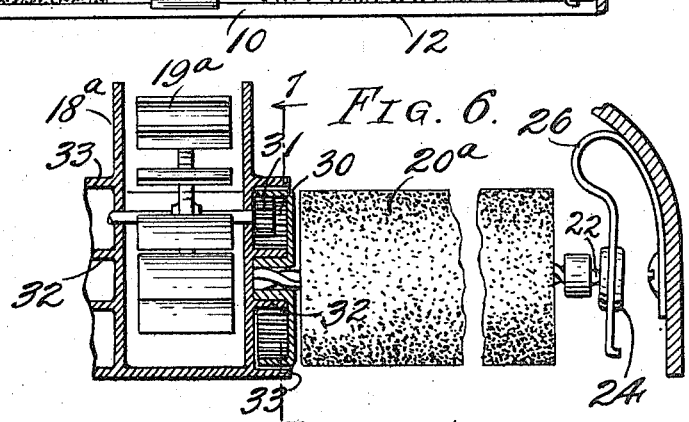

In these drawings Figure 1 is a perspective view of a complete vacuum cleaner of the type referred to; Fig. 2 is a vertical, longitudinal, sectional view through such a device disclosing a preferred form of the invention; Fig. 3 is a bottom plan view of the device illustrated in Fig. 2; Fig. 4 is a sectional view taken upon the line 4—4 of Fig. 2, and looking in the direction of the arrows; Fig. 5 is a perspective view of one of the end bearings preferably employed with the devices shown in Fig. 3; Fig. 6 is a view similar to Fig. 4 showing a modified construction of brush and turbine, the same corresponding to the line 6—6 of Fig. 7; Fig. 7 is a detail view taken upon the line 7—7 of Fig. 6 and showing the gear and turbine arrangement; Fig. 8 is a vertical, longitudinal, sectional view through a modified form of cleaner and agitating device; Fig. 9 is a cross-sectional view of the same taken upon the line 9—9 of Fig. 8 and looking in the direction of the arrows; Fig. 10 is a vertical, longitudinal, sectional view through another modified type of the cleaner and agitating device; Fig. 11 is a bottom plan view of the parts shown in Fig. 10; Fig. 12 is a perspective view of some of the parts illustrated in Figs. 10 and 11; Fig. 13 is a cross section of the beater shaft and parts mounted thereon; Fig. 14 is a longitudinal, sectional view of the said shaft and the parts thereon; and Fig. 15 is a view of another modification showing the use of an oscillating motor.

This invention concerns particularly the type of vacuum cleaner illustrated in Fig. 1 comprising a shoe or suction casing illustrated generally at A, a motor inclosed within a casing B adjacent thereto, a handle C attached to the shoe or motor casing by means of the fork D or other suitable means, and a dust bag E connected to the fan casing and adapted to retain the dust while permitting the slow escape of the air, the whole being preferably supported upon suitable rollers F. In its preferred embodiment the shoe or base member consists of a metal casing having therein a substantially cylindrical fan chamber 1 and having mounted thereabove and coaxial therewith a suitable electric motor 2 having a shaft 3 to the lower end of which is attached the fan 4 which rotates freely within the casing 1. The bottom of the fan chamber is defined by a flat plate 5 perpendicular to the shaft 3 and having an opening 6 opposite the center of the fan which is the region of lowest pressure in the fan chamber. Communicating with the outer portion of the fan casing at one point and preferably arranged tangentially thereto is an outlet beak 7 to the end of which is attached the porous bag E, the mouth of that bag preferably being provided with a suitable check valve as shown.

The lower part of the shoe beneath the plate 5 is preferably extended laterally in both directions as shown in Figs. 1, 3 and 4 and is provided with an elongated, downwardly-opening mouth 10 defined by spaced substantially parallel lips 11—12. The formation of the shoe is perferably such that all parts of the mouth are in free and direct communication with the opening 6 so that a substantially uniform suction is exerted over all parts of the same, but the mouth is generally set forward of the opening 6 a considerable distance as illustrated in Fig. 2 so as to permit the machine to operate close to walls, furniture, etc. The wall of the shoe opposite the opening 6 is preferably apertured as shown at 13 and provided with a removable cover 14 for permitting a hose to be attached directly in the opening 6 whereby extension tools can be employed for cleaning walls, draperies, etc.

In the wall of the fan chamber 1 at a point substantially opposite the outlet 7 I have illustrated a small chamber 15, the same being here shown as separated from the main fan chamber by means of a screen 16 secured in place by having the metal of the chamber wall cast about it or in other suitable manner, such chamber 15 being placed in communication with the interior of the mouth by means of an air duct 17. Secured within the mouth 10 beneath this duct is a flat walled turbine casing 18 having therein a light turbine wheel 19 whose vanes are arranged in line with the air blast issuing from the duct 17. Mounted within the mouth 10 at each side of said turbine is a rotatable brush 20, the brushes shown in Fig. 4 being of frusto-conical shape and having their axes inclined to each other and to the axis of the turbine 19. In the construction illustrated in Fig. 4 the brushes are connected to the turbine by means of universal joints 21, and their outer ends are provided with bearings 22 received in sockets 23, formed in blocks 24 slidably mounted in slots 25 formed in free legs of U springs 26 the other legs of which are secured to the walls of the shoe. With this construction the weight of the brushes will cause them to fall to their lowest possible position during the time that the machine is in use, while the carpet or other floor covering will be sucked upwardly into the mouth as shown in Fig. 2. Accordingly the mechanism is entirely operative even though the brush be mounted a sufficient distance within the shoe so as in no instance to project beyond the lips 11—12, and such is the arrangement which I prefer because of the greater safety of the brush.

In Figs. 6 and 7 I have illustrated a slightly different arrangement, wherein the brush 20$^a$, instead of being secured directly to the shaft of the turbine 19$^a$, is geared thereto, the brush shaft preferably being provided with an internal gear 30 meshing with a pinion 31 secured to the shaft of the turbine. The inner end of the brushes are preferably journaled in sockets 32 formed on the walls 18$^a$ of the turbine casing, and the opposite ends of the brushes being pivoted in slidable blocks 24 mounted in the legs of U springs 26. In the latter instance the brush 20$^a$ is shown as cylindrical, although any desired shape of brush can be employed. In either case it is sufficient to remove the brush merely to draw together the legs of the springs 26 whereupon the brush can be immediately removed for cleaning. The internal gears are set within flanges 33 formed upon the walls of the turbine casing so as to shield the gears from dust and lint.

In Figs. 8 and 9 the fan casing is shown at 1$^a$, the fan at 4$^a$, the exhaust beak at 7$^a$, the pressure chamber at 15$^a$ and the pressure duct at 17$^a$. In this case the agitating device consists of a pair of brushes 20$^b$—20$^b$ mounted upon a single shaft 35 which carries at a point opposite the duct 17$^a$ one or more suitable turbine wheels 19$^b$ no casing being employed in this case. Each end of the shaft 35 is provided with a bearing 36 which is received in a socket 37 formed in one of the arms of a lever 38 which is pivoted at 39, the opposite end of said lever being formed with a counterweight 40. The weight of the brush and turbine is preferably such as slightly to overbalance the counterweights, so that the brushes will bear upon the floor or floor covering with a gentle pressure. The downward effect of the air blast upon the turbine wheels will also tend to increase this pressure. This arrangement permits the use of a large brush and more fragile bristles with a minimum of wear and tear.

In Figs. 10 to 14 inclusive I have illustrated another construction wherein a single shaft 45 is employed, the same being sprung into suitable bearings 46 carried at the ends of the shoe, and the shaft being provided with a plurality of vanes 47 carried along its length and arranged to receive pressure air through a passageway 17$^c$ communicating with the high-pressure region of the fan chamber. In the present instance the interior of the shoe is illustrated as formed with a flange 48 whereby the air issuing from this duct may be directed upon the vanes, this duct being of much greater lateral extent than in the previous modification owing to the longitudinal separation of the vanes. Also in this case I have shown ring-shaped beaters interspersed with the vanes and adapted to agitate the carpet or other fabric, while in Fig. 14 I have illustrated brush fibers interspersed with the same and arranged to agitate the dust particles.

According to the construction illustrated in Figs. 10 to 13 inclusive, sheet metal blanks are folded at one side to form hollow tubes 50 adapted to be sleeved upon the shaft 45, those tubes and shafts being preferably of prismatic form, separated portions of the blank being extended outwardly and curved laterally to receive the air. Between adjacent vanes the metal of the blank is rolled to form an eccentric annular part 51 thus producing a cam, and upon each of these cams is mounted a loosely fitting ring 52 of hard rubber or like material. Each of the vanes 47 is preferably extended lengthwise of the shaft a greater distance than its corresponding tube 50 so as substantially to engage the adjacent edge of the cam of the next section, wherefore these vanes define accurately the positions of the beater-rings and prevent longitudinal movement of the same. The result is that upon the revolution of the shaft 45 the rings 52 are vibrated rapidly up and down, being thrown violently against the carpet or other covering at every revolution.

In case fibers or brushes be desired the same can be provided as illustrated in Fig. 14. In this case the shaft 45 is illustrated as apertured at 55 and bristles 56 passed therethrough, the same being thereafter clamped together between the abutting ends of the tubes 50—50.

In Fig. 15 I have shown a simple form of oscillating motor or flutter-device comprising a rock shaft 60 pivoted inside the shoe and having bristles 61, a pair of vanes 62, 62 secured at opposite sides of the shaft by means of arms 63, 63, and a deflector 64 pivoted in line with the slot and suitably connected to the shaft 60 as by means of a rod 65. The air passing through the duct 17 will be thrown first upon one vane and then on the other, vibrating the brush and agitating the dust particles within the fabric.

It will be apparent that the agitating devices contemplated by this invention may take a great variety of different forms of which those illustrated herein are merely a suggestion. The arrangement of the pressure duct as illustrated in Fig. 4 is more satisfactory than others because of the fact that less dust appears to pass through it when it is led from the bottom part of the fan chamber than when it is led from a point more directly in front of the fan as shown in Fig. 8. However, only a small amount of air passes through this duct and that amount is immediately returned to the fan by way of the opening 6. Also the location of this duct at the greatest possible distance from the discharge beak 7 results in the highest possible pressure. In addition the obstruction to the escape of the air produced by the bag or whatever other dust disposing means be employed increases the pressure within the fan chamber and so enhances the power of the turbine.

In case it be desired to attach a hose in the opening 6 for the purpose of cleaning walls, draperies, and the like, it is necessary to close the duct 17 since otherwise more or less dust and air will be blown out into the room. For this purpose I have shown the inner wall of the shoe as provided with a slideway $a$ adapted for the reception of a slidably plate $a'$. Ordinarily, of course, the dust discharged through this duct is returned directly to the fan via the opening 6.

Having now particularly described and ascertained the nature of my invention and in what manner the same is to be performed, I declare that what I claim is:

1. In a vacuum cleaning machine, in combination, a fan chamber, a centrifugal fan therein, said chamber having an inlet adjacent to the low pressure region of said fan chamber and an outlet in one part of the high-pressure region thereof, a shoe having therein an air inlet passage, floor engaging agitating mechanism in said shoe, a connection between said inlet passage and a part of said high-pressure region removed from said outlet, whereby a blast of air is diverted into said shoe, and driving devices operatively connected to said agitating mechanism and located in the line of said blast.

2. A vacuum cleaning machine having a fan chamber and a shoe, said shoe having therein an air inlet passage communicating with the low-pressure region of said fan chamber, agitating devices located in said shoe, a connection between the high-pressure region of said chamber and said inlet passage, and operating devices arranged in line with said connection and operatively connected to said agitating devices.

3. A vacuum cleaning machine having a fan chamber and a shoe, said shoe having therein an inlet passage communicating with the low pressure region of said fan chamber, a shaft journaled in said shoe, vanes mounted on said shaft, an air duct connected with the high pressure region of said fan chamber and arranged to direct upon said vanes the air passing therethrough, and agitating devices operatively connected to said shaft.

4. A vacuum cleaning machine having a fan chamber and an elongated, downwardly facing inlet mouth, an exhaust fan in said chamber, said inlet mouth communicating with said chamber adjacent to the low pressure region of said fan and said chamber having a discharge outlet at one point in the high-pressure region thereof, a rotatable agitating device located in said inlet mouth, and an air motor operatively connected to said agitating device, there being a pressure-air duct communicating with the high-pressure region of said fan chamber at a point removed from said discharge outlet and arranged to supply air to said motor.

5. In a vacuum cleaner, the combination of a fan and its chamber, a shoe communicating with said chamber and having an inlet mouth, an agitating device in said mouth, adapted to operate on the surface to be cleaned, an air motor driven by the blast from said fan, said chamber communicating with said shoe to deliver the blast to the motor, and the motor being operatively connected to the agitating device.

6. In a vacuum cleaner, the combination of a fan chamber having an axial inlet opening, and peripheral outlet openings located respectively at opposite sides of said chamber, a centrifugal fan in said chamber, a shoe communicating with said inlet opening, and a dust receptacle communicating with one of said outlet openings, the other outlet opening communicating with the shoe to deliver a blast into the same.

7. A vacuum cleaning machine having a fan chamber and a hollow body, there being an air inlet passage connecting the interior of said hollow body with the low pressure region of said fan chamber and a pressure duct connecting the interior of said hollow body with the high-pressure portion of said fan chamber, a rotary turbine mounted within said hollow body and arranged to be operated by the air passing through said duct, and agitating devices operatively connected to said turbine.

8. A vacuum cleaning machine having a fan chamber and a shoe, there being an air inlet passage connecting the interior of said shoe with the low pressure region of said fan chamber and a pressure duct connecting the interior of said shoe with the high-pressure portion of said fan chamber, operating devices arranged in line with said duct and adapted to be driven by the air passing therethrough, and agitating devices located within said shoe and operatively connected to said operating devices, said agitating devices being yieldingly connected to said shoe so as to limit their pressure upon the floor.

9. A vacuum cleaning machine having a fan chamber and a hollow body, there being an air inlet passage connecting the interior of said hollow body with the low pressure region of said fan chamber and a pressure duct connecting the interior of said hollow body with the high-pressure portion of said fan chamber, operating devices arranged in line with said duct and adapted to be driven by the air passing therethrough, and floor engaging agitating devices operatively connected to said operating devices so as to be driven thereby, said agitating devices being detachably mounted in said hollow body so as to facilitate the removal of lint therefrom.

10. In a suction cleaner, a hollow body having a fan chamber and a collecting shoe communicating therewith, an exhaust fan in said fan chamber, said shoe having an inlet mouth, and the wall of the shoe being formed with an air-passageway, and floor engaging agitating devices located wholly within said inlet mouth and having motor blades projecting in line with said passageway, and adapted to be actuated by the air passing through said passageway to operate said devices.

11. In a cleaner, a suction nozzle, a rotary shaft located inside said nozzle, rotating vanes carried by said shaft, and brushing devices rotatable with said shaft additional to said vanes, the wall of the nozzle being formed with an air passageway debouching upon said vanes and communicating with a region of higher pressure.

12. In a cleaner, a fan chamber, a suction nozzle, one of the walls of said suction nozzle having a passageway communicating with the high-pressure side of the fan chamber, a shaft within said nozzle and having vanes in line with said passageway, and work engaging agitating devices located in said inlet mouth and operatively connected to said shaft.

13. In a cleaner, a suction nozzle having an elongated inlet mouth, a shaft journaled inside said nozzle and having radiating vanes, the wall of said nozzle being formed with an air passageway debouching upon said vanes, and work-engaging agitating mechanism located in said inlet mouth and operatively connected to said shaft and adapted to be driven thereby.

In testimony whereof, I hereunto affix my signature in the presence of two witnesses.

JAMES BLAINE KIRBY.

Witnesses:
HAROLD E. SMITH,
BRENNAN B. WEST.